United States Patent [19]

Chang

[11] Patent Number: 5,567,013

[45] Date of Patent: Oct. 22, 1996

[54] SEAT SUPPORT AND SLIDE MECHANISM

[76] Inventor: Chung L. Chang, 22834 Lazy Trail Rd., Diamond Bar, Calif. 91765

[21] Appl. No.: 390,708

[22] Filed: Feb. 17, 1995

[51] Int. Cl.$^6$ .............................. A47C 1/02; B60N 2/12
[52] U.S. Cl. ...................... 297/341; 297/344.1; 248/916
[58] Field of Search .................. 297/341, 344.1; 248/424, 429, 430, 393, 916

[56] References Cited

U.S. PATENT DOCUMENTS

| | | |
|---|---|---|
| 325,352 | 9/1885 | McKay . |
| 778,821 | 12/1904 | Duryea . |
| 1,664,893 | 4/1928 | Meyering . |
| 2,153,998 | 4/1939 | Verderber et al. . |
| 2,336,013 | 12/1943 | Hamilton . |
| 2,949,043 | 8/1960 | Fichter et al. . |
| 3,081,114 | 3/1963 | Esty . |
| 3,156,004 | 11/1964 | Strien et al. . |
| 3,185,510 | 5/1965 | Huckins et al. . |
| 3,315,298 | 4/1967 | Strien et al. . |
| 3,398,987 | 8/1968 | Lynn et al. . |
| 3,432,881 | 3/1969 | Putsch et al. . |
| 3,479,088 | 11/1969 | Bonnaud . |
| 3,507,000 | 4/1970 | Strien et al. . |
| 3,602,547 | 8/1971 | Tabor . |
| 3,607,128 | 9/1971 | Faust . |
| 3,638,243 | 2/1972 | Campbell, Jr. et al. . |
| 3,731,342 | 5/1973 | Cousin . |
| 3,788,698 | 1/1974 | Perkins . |
| 3,833,965 | 9/1974 | Hess . |
| 3,840,268 | 10/1974 | Johndrow . |
| 3,902,757 | 9/1975 | Yoshimura . |
| 3,931,996 | 1/1976 | Yoshimura . |
| 3,966,253 | 6/1976 | Berghof et al. . |
| 3,973,288 | 8/1976 | Pickles . |
| 3,999,247 | 12/1976 | Cremer . |
| 4,085,969 | 4/1978 | Nakane . |
| 4,101,169 | 7/1978 | Muraishi et al. .................. 297/341 |
| 4,103,964 | 8/1978 | Klingelhofer et al. . |
| 4,147,386 | 4/1979 | Stolper . |
| 4,178,037 | 12/1979 | Pickles . |
| 4,223,947 | 9/1980 | Cremer . |
| 4,314,729 | 2/1982 | Klueting . |
| 4,423,904 | 1/1984 | Crawford ............................. 297/341 |

(List continued on next page.)

FOREIGN PATENT DOCUMENTS

| | | |
|---|---|---|
| 51819 | 2/1972 | Australia . |
| 758404 | 5/1967 | Canada . |
| 0006610 | 6/1979 | European Pat. Off. . |
| 1414700 | 11/1964 | France . |
| 2339535 | 3/1975 | Germany . |
| 2404216 | 8/1975 | Germany . |
| 2845545 | 4/1980 | Germany . |
| 3027629 | 2/1982 | Germany . |
| 747800 | 4/1956 | United Kingdom . |
| 1342371 | 1/1974 | United Kingdom . |

OTHER PUBLICATIONS

Figures 1 & 1a – Prior Art Drawings, Manufacturer – I.A.P.M., LTD., Ontario, California, 1994.

*Primary Examiner*—Peter M. Cuomo
*Assistant Examiner*—Rodney B. White
*Attorney, Agent, or Firm*—Knobbe, Martens, Olson & Bear

[57] ABSTRACT

A support assembly for a vehicle seat, including a first slide mechanism adapted to be mounted under one side of the seat, a second slide mechanism adapted to be mounted under a seat opposite said first slide mechanism, and a lock connecting the first and second slide mechanisms. The first and second slide mechanisms include a support defining a track and a bracket slidable along the track in the directions of relative motion parallel to one another. The lock includes a first and second series of stations fixed with respect to the respective supports and first and second latches pivotally mounted to respective seat brackets which are engageable with said series of stations. The latches are pivotably mounted about a first and second axis of rotation parallel to one another. An actuator comprising a pivot shaft is connected to the first latch and is rotatably secured within a mount so as to be rotatable about a third axis of rotation which is perpendicular to the first axis of rotation. A handle is provided extending opposite the second track from the first track to avoid possible injury from use of the assembly.

11 Claims, 5 Drawing Sheets

U.S. PATENT DOCUMENTS

| | | | |
|---|---|---|---|
| 4,457,557 | 7/1984 | Une . | |
| 4,497,518 | 2/1985 | Nishimura et al. | 297/341 |
| 4,615,551 | 10/1986 | Kinaga et al. | 297/341 |
| 4,621,867 | 11/1986 | Perring et al. | 248/429 X |
| 4,856,847 | 8/1989 | Kanai | 297/341 |
| 4,872,726 | 10/1989 | White et al. . | |
| 4,875,735 | 10/1989 | Moyer et al. . | |
| 4,909,570 | 3/1990 | Matsuhashi | 297/341 |
| 5,020,853 | 6/1991 | Babbs | 297/341 |
| 5,052,751 | 10/1991 | Hayakawa et al. | 297/341 |
| 5,352,019 | 10/1994 | Bauer et al. | 297/341 |

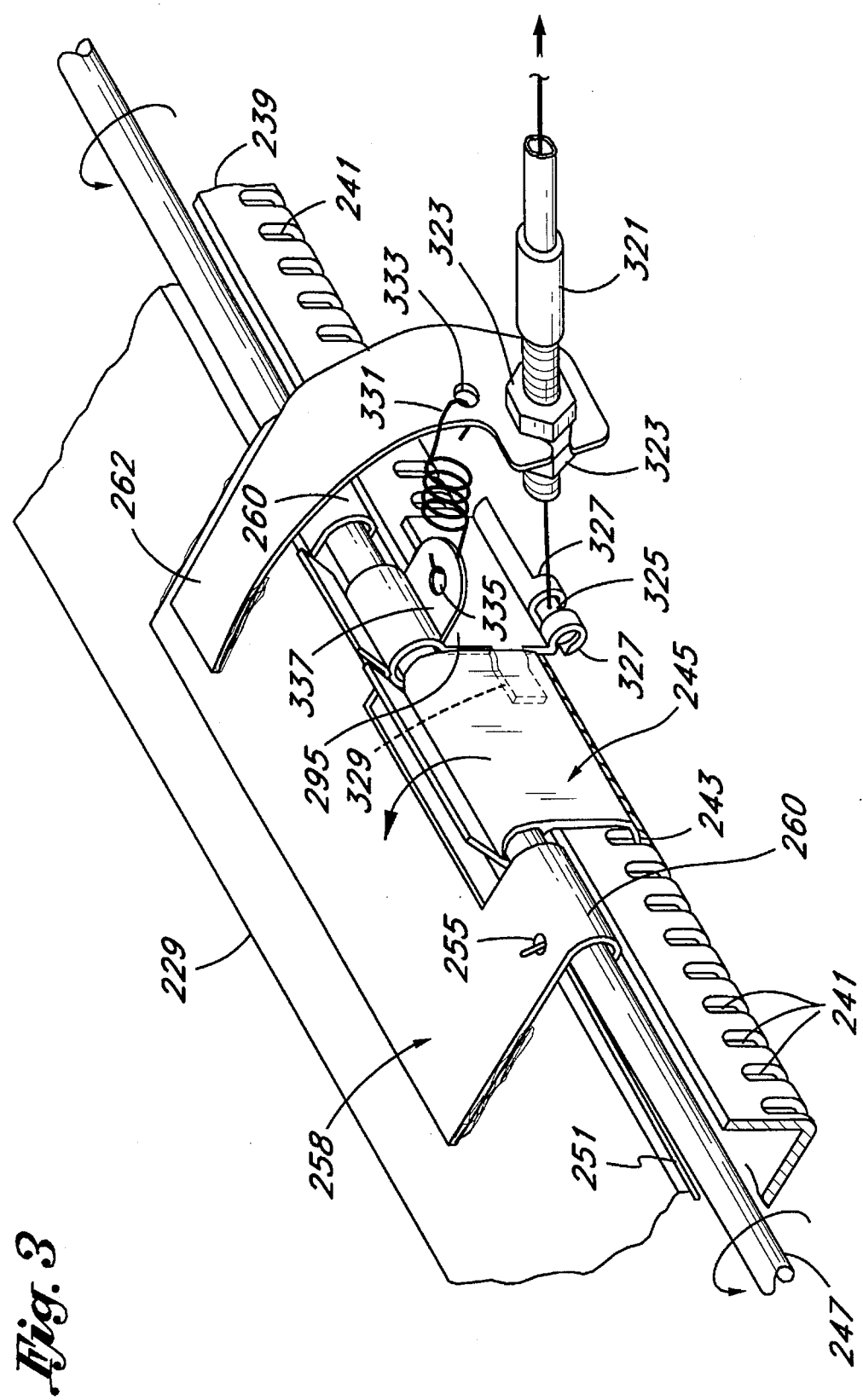

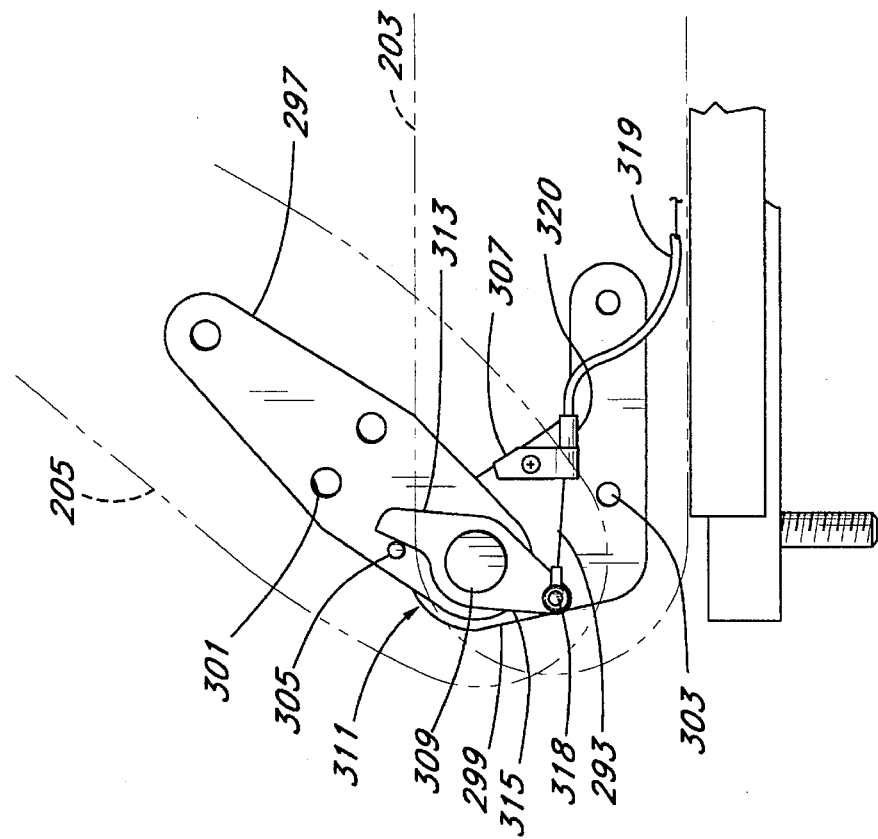
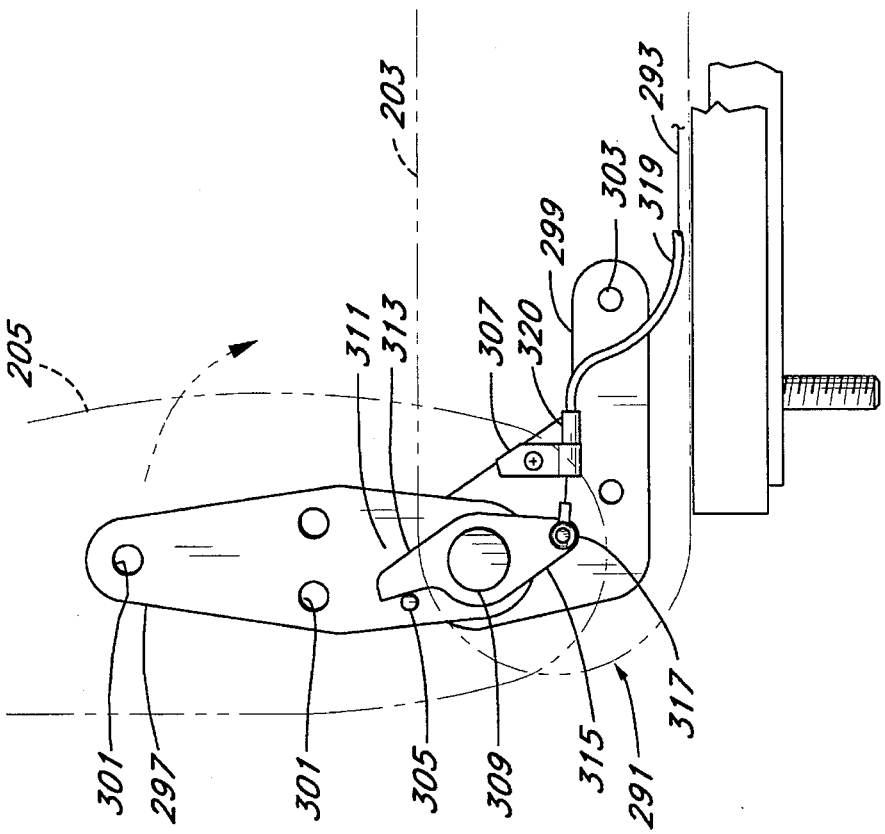

SEAT SUPPORT AND SLIDE MECHANISM

FIELD OF THE INVENTION

This invention relates to the field of seat supports and, in particular, to slidable vehicle seat supports.

BACKGROUND OF THE INVENTION

Vehicle seat supports typically include a slide assembly which permits the seat to slide forward or rearward both for comfort and to permit the driver of the vehicle to reach the vehicle controls. As it is typical for a vehicle to be used by a number of drivers, it is important that the support mechanism be easily adjusted yet securely lock the seat in place to avoid impairing the driver's ability to control the vehicle during a sudden stop.

In addition to safety requirements, it is desirable that the manufacturing and assembly costs of the supports be minimized. In particular, the costs of tooling and perfecting the manufacturing process until parts of the desired tolerances can be reliably manufactured can be very expensive. Accordingly, it is desirable that any modification to the support assembly not require a modification of the basic seat design.

FIGS. 1 and 1a illustrate a support assembly 111 of the prior art. The assembly 111 includes a first slide mechanism 113, a second slide mechanism 115, and a lock 117. The first slide mechanism 113 includes a first support 119 defining a track and a first bracket 121 slidable along the track. The second slide mechanism similarly comprises a second support 123 defining a second track and a second bracket 125 slidable along the second track. The lock 117 includes a separate first strike member 127 secured to the first bracket 121 and a first support shaft 129 rotatably secured by a number of first shaft holders 131. The first support shaft 129 includes a first locking fork 133 engageable with the first strike member 127 to prevent relative movement of the first support 119 and the first bracket 121.

The lock further includes a second strike member (not shown) secured to the second bracket 125, a second support shaft 137 mounted by a pair of second shaft holders (not shown) and a second locking fork (not shown) extending from the second support shaft 137.

The first support shaft 129 includes a control arm portion 143 extending beyond the front end of the first bracket 121 and a control handle 145 forming a 90° angle with the axis of the first support shaft. The first support shaft 129 is connected to the second support shaft 137 by means of a first spacing flange 147 connected to a second spacing flange 149 by means of a wire 151.

To prevent the inadvertent release of the lock 117, the first locking fork 133 is biased into engagement with the first strike member 127 by means of a first spring 153 biasing the first support shaft 129. Similarly, a second spring 155 biases the second support shaft 137 and therefore the second locking fork (not shown) into engagement with the second strike member (not shown) preventing relative movement of the second support 123 relative the second bracket 125.

The first support 119 and second support 123 are secured to the floor of the vehicle seat by a first pair of support attachment bolts 157 and second pair of support attachment bolts 159, respectively. Likewise, the first bracket 121 and second bracket 125 are secured to the vehicle seat by means of a first pair of bracket attachment bolts 161 and second pair of bracket attachment bolts 163.

In operation, the position of the vehicle seat is adjusted by means of rotating the horizontally inward extending control handle 145 upward from right to left as shown in FIG. 1, causing the control arm portion 143, as well as the remainder of the first support shaft 129 to rotate about its axis (as shown in FIG. 1a) disengaging the first locking fork 133 from the first strike member 127 and causing the wire 151 secured to the first spacing flange 127 to pull the second spacing flange depending downwardly from the second support shaft 137 to rotate the second support shaft 137 in a counter-clockwise direction to disengage the second locking fork 141 from the second strike member 135.

Although the aforementioned slide assembly is both simple and reliable, an improved vehicle seat support assembly would be desirable.

SUMMARY OF THE INVENTION

While the aforementioned support assembly can be easily adjusted by the passenger sitting in the seat and can securely lock the seat in place, this assembly has a number of significant limitations. These limitations are particularly significant when the assembly is used in a two-door vehicle. Two-door vehicles typically have a relatively cramped back seat, with the side doors being positioned sufficiently forward that the front seat back must be released and pushed forward to provide sufficient space for a passenger in the back seat to exit the vehicle. Unfortunately, even with the seat back pushed fully forward, particularly for larger passengers, the exit space thus provided is still insufficient to permit a comfortable exit from the vehicle.

In the event of an accident where the passenger in the front seat of the vehicle is incapacitated and the seat back cannot be pushed fully forward, the passenger in the back seat could be trapped in the back of the vehicle due to insufficient room available to exit.

Accordingly, the present invention is an improved seat support and slide mechanism providing both a vehicle slide mechanism release for the front and back passenger, as well as an auxiliary slide mechanism release which is automatically actuated when the standard seat back release is actuated and the seat back is pushed forward. This allows the passenger in the back seat to adjust the position of the slide mechanism without the need for assistance from another party operating the seat mechanism in the front seat. In addition, it automatically releases the slide mechanism when the seat back is pushed forward so that the passenger in the back seat will have sufficient room to comfortably exit the vehicle.

An important aspect of the present invention is a support assembly having the aforementioned enhanced capabilities, yet using many of the same structural components as the prior art design, minimizing re-tooling costs. Advantageously, this assembly is also adapted to be assembled by virtually the identical assembly process as the prior art design, thereby minimizing disruption of current assembly facilities.

Another important aspect of the present invention is a support assembly for a seat having a sitting platform and a back rotatably secured thereto. The assembly includes a first slide mechanism, a second slide mechanism, a first latch, a first actuator, a second actuator, and an auxiliary actuator. The slide mechanisms are adapted to be mounted under opposite sides of a seat, and each includes an elongate support defining a track having a first end and a second end, and a bracket slidable along its respective track in a direction of relative motion such that the two brackets slide parallel to one another. The first latch is mounted on one of the slide mechanisms and is selectively engageable to prevent movement of one of the slide mechanisms. A first actuator extends beyond the first end of the first bracket to provide easy access for the user. The first actuator is linked to the first latch such that a predetermined manual manipulation of the first actuator causes the first latch to disengage. The second actuator extends beyond the second end of the first bracket, providing easy access to the passenger in the rear of the vehicle. The second actuator is linked to the first latch such that a predetermined manual manipulation of the second actuator causes the latch to disengage.

The auxiliary release is a linkage with one end adapted to be secured to a seat back and a second end linked to the first latch such that a predetermined movement of the first end of the linkage causes the first latch to disengage.

Desirably, this support assembly includes an arm adapted to be secured to a seat back so that a first portion of the arm extends below the seat back axis of rotation and the first end of the linkage is secured to the first portion of the arm. This first portion of the arm provides a spacer so that forward rotation of the seat back results in the first end of the linkage being pulled away from the first end of the first bracket. Advantageously, the arm further includes a second portion extending above the seat back axis of rotation and a stop positioned so that when the seat back is rotated forward, it presses against the second portion of the arm, causing forward rotation of the second portion of the arm and rearward rotation of the first portion of the arm.

Yet another aspect of the invention is a seat including a sitting platform, a back, a back lock, a back lock release, a first slide mechanism, a second slide mechanism, a first latch, a first actuator, and a linkage. The seat back is rotatably mounted to the rear of the platform and is secured in a plurality of fixed upright positions by the back lock. The first latch is mounted on one of the slide mechanisms and is selectively engageable to prevent movement of one of the mechanisms. The first actuator is secured to and extends beyond the front of the sitting platform and is linked to the first latch such that a predetermined manual manipulation of the first actuator causes the first latch to disengage. The first end of the linkage is secured to the side of the seat opposite the back lock release and is linked to the first latch such that predetermined movement of the first end of the linkage causes the first latch to disengage. Advantageously, the assembly also includes a second actuator extending beyond the rear of the sitting platform linked to the first latch such that a predetermined manual manipulation of the second actuator causes the first latch to disengage.

Advantageously, the assembly further includes a second latch mounted on the other slide mechanism opposite the first latch which is selectively engageable to prevent movement of the subject slide mechanism. The first actuator is linked to the second latch such that the predetermined manual manipulation of the first actuator causes the second latch to disengage as well. Likewise, the second actuator is linked to the first latch such that a predetermined movement of the second actuator causes the latch to disengage. Finally, the second latch is connected to the linkage such that a predetermined movement of a linkage causes the second latch to disengage as well.

These and other aspects of the present invention will now be discussed in connection with a preferred embodiment, which is intended to illustrate, but not limit the scope of, the present invention.

BRIEF DESCRIPTION OF THE DRAWINGS

FIG. 1a is an enlarged perspective view illustrating the operation of the first locking fork of the support assembly of FIG. 1.

FIG. 3 is an enlarged perspective view of the portion of the support assembly of FIG. 2 within the circle 3—3.

FIG. 4 is an enlarged right elevational of the hinge of the support assembly of FIG. 2, showing the hinge in an engagement position.

FIG. 5 is an enlarged right elevational of the hinge of the support assembly of FIG. 2, showing the hinge in a disengagement position.

DETAILED DESCRIPTION OF THE PREFERRED EMBODIMENT

Figure 2:
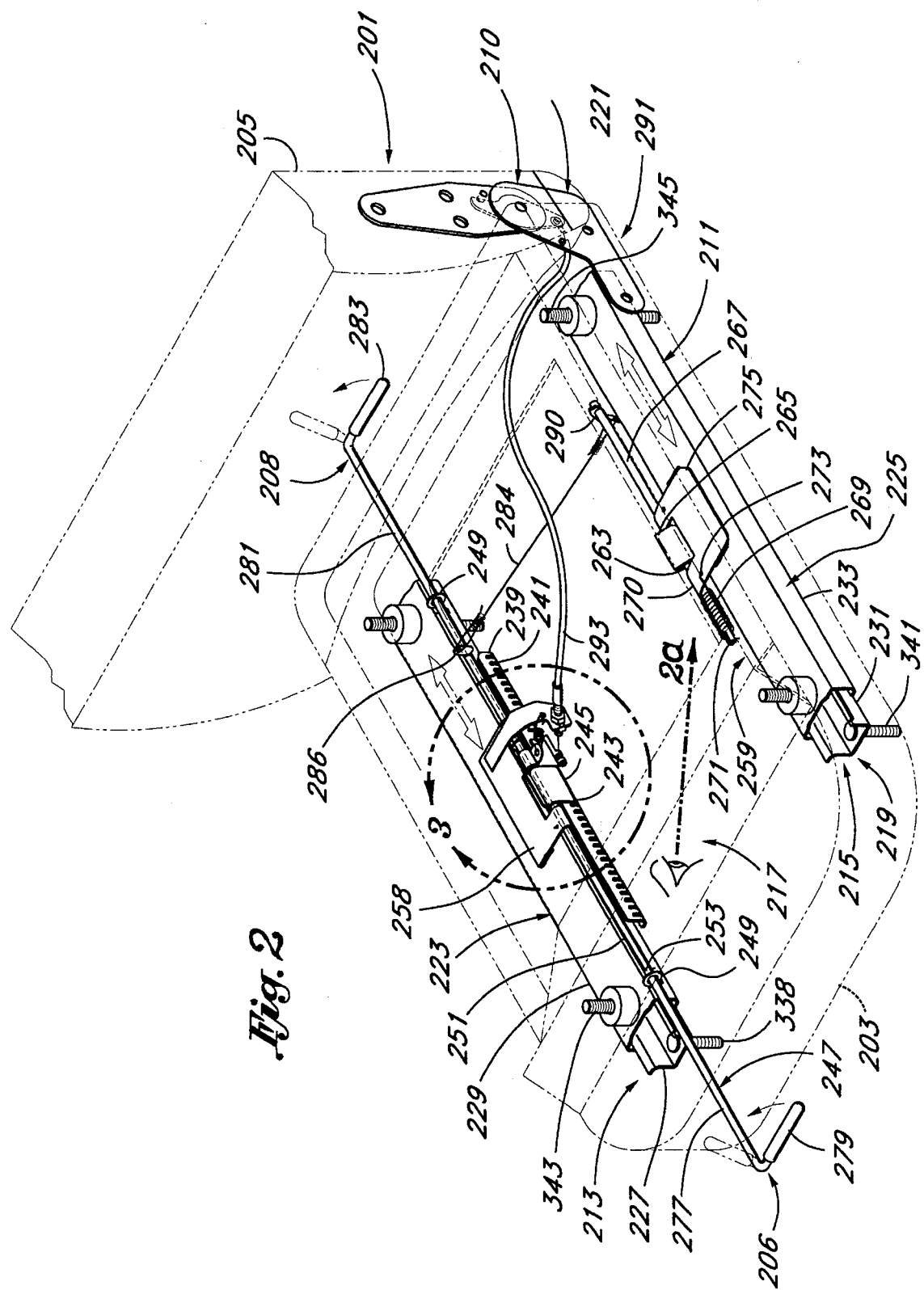
FIG. 2 is a perspective view of the support assembly for a seat of the present invention with the seat illustrated in phantom.
Figure 2A:
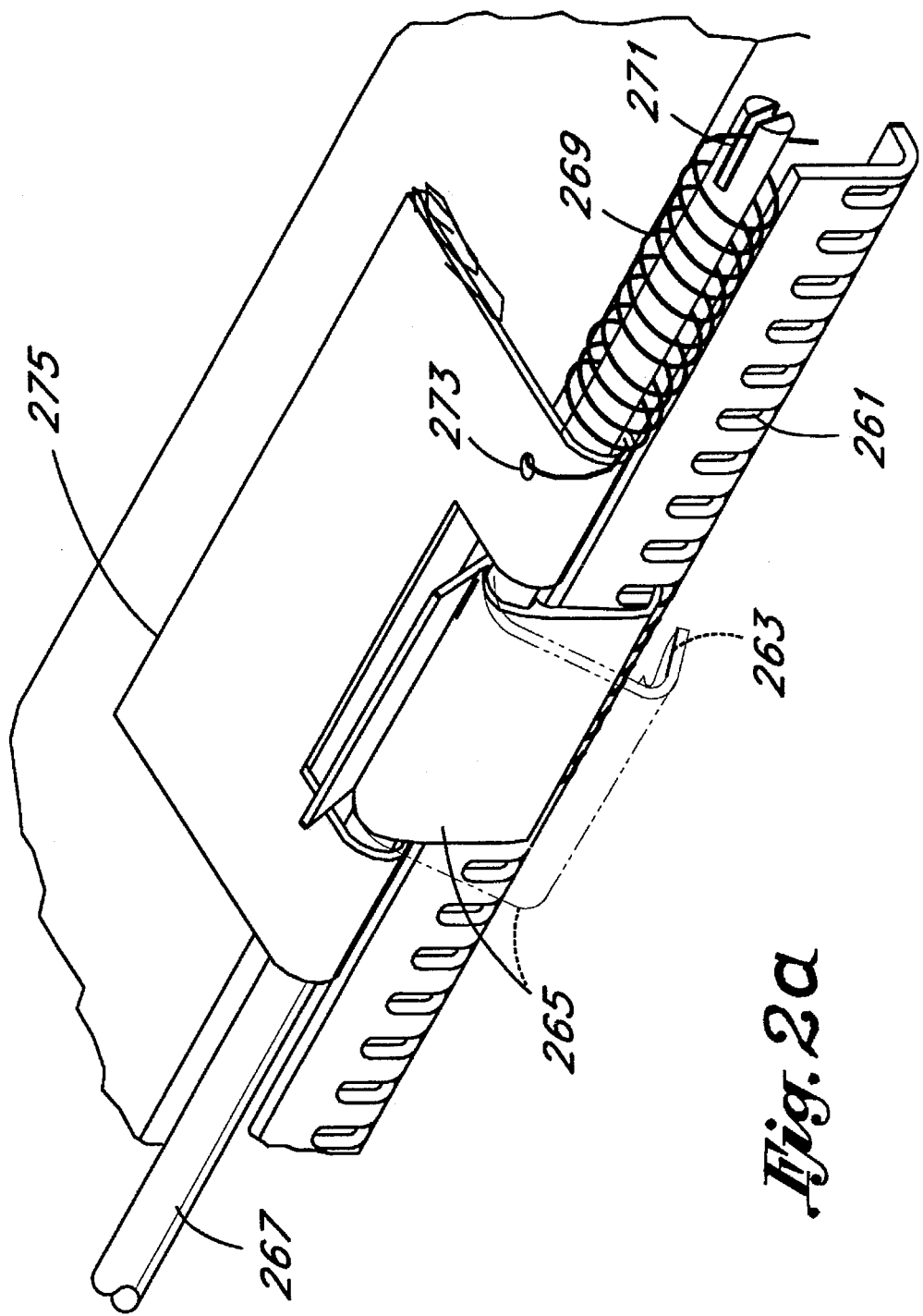
FIG. 2a is an enlarged perspective view illustrating the operation of the second fork of the support assembly of FIG. 2.

FIGS. 2–4 illustrate a preferred seat 201 and seat support assembly 211 of the present invention. The seat 201 includes a horizontal sitting platform 203 and an upstanding seat back 205. The support assembly 211 includes a first slide mechanism 213, a second slide mechanism 215, a slide lock 217, a first release 206, a second release 208 and a third or auxiliary release 210.

The support assembly has a first end 219, a second end 221, a first side 223, and a second side 225. Although not necessary to the operation of the support assembly, it is intended that the first end 219 of the support assembly 211 be positioned proximate the front of the vehicle seat (shown in phantom) and the second end 221 be positioned proximate the back end of the vehicle seat. Likewise, the first side of the support assembly is intended to be positioned proximate the outer edge of the vehicle seat, and the second side is intended to be positioned proximate the opposite side of the vehicle seat.

The first slide mechanism 213 includes a first elongate metal support 227 defining a first track and having a generally inverted omega-shaped cross section, as is known in the art. This first support 227 slidably receives and retains a first elongate rigid metal seat bracket 229 having a generally C-shaped cross section, as is likewise known in the art. The second slide mechanism 215 includes a similarly shaped elongate second support 231 defining a second track and a second bracket 233 slidable along said second track. The first bracket 229 is slidable along the first track in the directions indicated by the arrow in FIG. 2. Likewise, the second seat bracket 233 is slidable along the second track in directions of relative motion illustrated by the arrow in FIG. 2. As will be appreciated, these first and second directions of relative motion are parallel to one another.

As will be discussed in detail below, the lock 217 selectively prevents movement of the first support 227 relative the first bracket 229 and the second support 231 relative the second bracket 233. The lock 217 comprises a multiplicity of components used to accomplish this end. Specifically, the lock 217 includes a first strike portion 239 of the first support 227, which defines a first series of stations or apertures 241 for selectively receiving a fork 245. This strike portion 239 may comprise an elongate generally L-shaped plate secured to the bottom surface of the first support 227 by an appropriate fastener (not shown). The first latch 245 is desirably mounted on a first pivot shaft 247 which in turn is rotatably mounted on the first bracket 229 by a pair of ring shaped pivot shaft holders 249, one of which is fixed to each end of the bracket 229, and a mounting flange 258 positioned in the middle of the bracket 229. The mounting flange 258 includes a pair of arms 260, each of which define a cylindrical slot for rotatably receiving the pivot shaft 247. The first latch may further comprise an extension finger 262, extending over and spaced from the pivot shaft, the purpose of which will be discussed below. One end of a first biasing member or torsion spring 251 is secured within an aperture 253 in the pivot shaft 249 proximate the first end 219 of the support assembly and an opposite end of the biasing member 251 is secured within an aperture 255 within one of the arms 260 of the mounting flange 258. The torsion spring 251 desirably biases the engagement portion 243 of the first latch 245 into engagement with the strike portion of the first plate.

Similarly, the lock 217 includes a second strike portion 259 of the second support 231, which defines a second series of stations 261 or apertures for receivably retaining a fork-shaped engagement portion 263 of a second latch 265. The second latch 265 is mounted on a second pivot shaft 267 which in turn is pivotably mounted on the second bracket 233 by means of a second mounting flange 275 having a pair of arms 270, each of which define a cylindrical slot for rotatably receiving the second pivot shaft 267. The fork-shaped portion 263 of the second latch 265 is biased into engagement with the second series of stations 261 of the second strike portion 259 by a second biasing member 269, such as a helical spring attached at one end within a notch 271 in the first end of the second pivot shaft 267 and at the other end within a second aperture 273 within a horizontal portion of one of the arms 270 of the second mounting flange 275.

The first pivot shaft 247 is linked to the second pivot shaft 267 by means of a flexible linkage 284, such as wire. The linkage 284 extends through a hole in a first flange 286 fixed to the first pivot shaft 247 and is clipped back to itself by an appropriate fastener. The first flange 286 extends upward and slightly inward from the first pivot shaft 247 when the first latch 245 is biased into full engagement with the first strike portion 239 of the first bracket 229. Similarly, the linkage 284 extends through a hole in a second flange 290 fixed to the second pivot shaft 267 and is clipped back against itself by an appropriate fastener. The second flange 290 extends vertically downward from the axis of rotation of the second pivot shaft when the second latch is biased into full engagement with the second strike portion 259.

Desirably, the lock 217 can be released by any one of three different releases. The first release 206 comprises a first control arm 277 or extension of the first pivot shaft 247 extending beyond the first end 219 of the sitting platform 203, so as to provide easy access to a user sitting on the sitting platform 203. Advantageously, the first control arm 277 defines a first control handle 279 extending from the axis of rotation of the first control arm at an right angle so as to provide both a convenient grip and leverage for the user.

Similarly, the second release 208 comprises a second control arm 281 or extension of the second pivot shaft 267 extending beyond the second end 221 of the sitting platform 203, so as to provide easy access to a user sitting behind the seat back 205, such as a user sitting in the back seat of a two-door vehicle. Advantageously, the second control arm 281 defines a second control handle 283 extending from the axis of rotation of the second control arm 279 at a right angle so as to provide both a convenient grip and leverage for the user. Importantly, by combining the first pivot shaft 247 with the first and second control arms, costs are minimized in that only one of the pivot shafts will be subject to forces requiring the added support of the first pivot shaft holders 249 and very little modification of the assembly process from the prior art is required.

In addition to the first and second release, the assembly advantageously utilizes a third release 210. The third release desirably includes a hinge actuator or hinge 291, a connecting cable 293 and a release flange 295. The hinge 291 is mounted at the juncture of the sitting platform 203 and the seat back 205 along the first side 221 of the support assembly. The release flange 295 is mounted on the first pivot shaft 247 proximate the second side 223 of the support assembly and is connected to the hinge actuator 291 by the connecting cable 293.

The hinge actuator 291 will now be described in greater detail with reference to FIGS. 4 and 5. The hinge 291 includes an elongate first or upper hinge section 297 secured to the seat back 205 by screws or other suitable fasteners (not shown), and a generally L-shaped second or lower hinge section 299 secured to the sitting platform 203 by screws or other fasteners. Both hinge sections 297 and 299 define a series of apertures 301, 303, respectively through which such fasteners may be inserted. In addition, a horizontally extending cylindrical pin or stop 309 is positioned within an aperture in the upper hinge section 297. A mounting bracket 307 is secured to the lower hinge section 299 near the juncture between the vertically and horizontally extending portions of the lower hinge by a fastener 309. A connecting stud 309 having enlarged ends rotatably secures the upper hinge section 297 and a cam 311 to the upstanding portion of the lower hinge 299. The cam 311 defines an upper arm portion 313 and a lower arm portion 315. An eyelet 317 at the end of the connecting cable 293 is rotatably secured to a horizontally extending pin 318 secured proximate the lower end of the lower arm portion 315 by means of a C-clip fastener. The cable 293 extends through a sheath 319 having a first end piece 320 which is secured to the lower hinge section 299 by the mounting bracket 307 and a second end piece 321 secured to the extension finger 262 of the mounting flange 258 on the first bracket 229 (FIG. 3). Specifically, the distal end of the extension finger 262 defines a U-shaped portion with the open end facing the front of the bracket 229, within which the externally threaded end piece 321 is positioned by a pair of nuts 323. The cable 293 extends through the end piece 321 and terminates within the side of a cylindrically shaped knob 325. The knob 325 is rotatably secured within a pair of arms 327 extending from the bottom of the release flange 295. As shown in FIG. 3, the upper portion of the release flange is fixed to the first pivot shaft 247, so that the release flange extends downward immediately adjacent the first latch 245. The release flange 295 includes a thin release appendage 329 extending parallel to the axis of the first pivot shaft 247 between the first latch 245 and the first strike portion 239. A safety spring 331 extends between an aperture 333 in the distal end of the extension finger 262 of the first mounting flange 258 and a similar aperture 335 in a horizontally extending flange 337 of the release flange 295.

As in the prior art, the first slide mechanism 213 of the support assembly 211 may be secured to the floor of a vehicle by a first pair of support attachment bolts 338, and the second support 231 may be attached to the vehicle floor by a second pair of support attachment bolts 341. Likewise, the first bracket 229 may be secured to the vehicle seat (shown in phantom) by a first pair of bracket attachment bolts 343, and the second bracket 233 may be secured to the vehicle seat by a second pair of bracket attachment bolts 345.

As in the prior art, each slide mechanism advantageously includes a pair of stop assemblies, such as a helical spring and a stop. Advantageously, when the respective supports 227, 231 reach the maximum extension, forward or rearward, the engagement members contact the stops, preventing further movement along the same direction by the brackets 229 and 233.

While the support assembly could be mounted on the seat in other orientations, the described mounting position advantageously puts the first and second control arms in a position accessible to both a user within the vehicle as well as a user standing outside the vehicle. Furthermore, the positioning of the hinge actuator on the inside of the seat prevents the hinge actuator from interfering with the standard seat back release mechanism of the seat.

Operation

In operation the lock 217 for the first and second slide mechanisms 211, 213 can be released in any one of three ways. One way is for a user sitting on the sitting platform 203 or standing outside the vehicle to rotate the first control handle 279 from its inward directed position about the axis of the first pivot shaft 262 with sufficient force to overcome the biasing force of the first and second biasing members 251 and 269. As the first pivot shaft 262 rotates, the fork-shaped engagement portion 243 of the first latch 245 disengages from the first series of stations 241 of the first strike portion 239 of the first support 227, releasing the first slide mechanism 213. Simultaneously, the safety spring 331 secured to the release flange 295 pulls the release flange upward until further movement of the release flange 295 is limited by the first latch 245.

Additionally, the rotation of the first pivot shaft 249 counterclockwise (as shown in FIG. 2) about its axis causes the distal end of the first flange 249 to travel away from the second pivot shaft 267 so that the link 284 pulls on the second flange 290, causing the second pivot shaft 267 to rotate in a clockwise direction (as shown in FIG. 2) disengaging the second fork-shaped engagement portion 263 of the second latch 265 from the second series of stations 261 of the second strike portion 259 of the second bracket 233.

When the seat 201 and, thus, the first slide bracket 229 and the second slide bracket 233 secured thereto, have been positioned in the desired location, the respective biasing members 251, 269 cause the respective pivot shafts 247, 267 to rotate, bringing the engagement portions 243, 263 of the first and second latches 245, 265 into locking engagement with the first and second strike portions 239, 259, respectively. In addition, as the first latch 245 rotates in a clockwise manner, the first latch 245 presses against the release appendage 329 of the release flange 295, forcing it downward until it is sandwiched between the first latch 245 and the first strike portion 239 of the first bracket 229.

Advantageously, the seat 201 and support assembly 211 also permits the slide mechanisms 213, 215 to be released by a passenger sitting behind the seat back 205. In a manner virtually identical to the first release 206, a user sitting behind the seat back 205 can rotate the second control handle 279 from its inward directed position about the axis of the first pivot shaft 262 with sufficient force to overcome the biasing force of the first and second biasing members 251 and 269. As the first pivot shaft 262 rotates, the fork-shaped engagement portion 243 of the first latch 245 disengages from the first series of stations 241 of the first strike portion 239 of the first support 227, releasing the first slide mechanism 213. Again, the safety spring 331 secured to the release flange 295 pulls the release flange upward until further movement of the release flange is limited by the latch 245.

Additionally, the rotation of the first pivot shaft 249 counterclockwise (as shown in FIG. 2) about its axis causes the distal end of the first flange 286 to travel away from the second pivot shaft 267 so that the link 284 pulls on the second flange 290, causing the second pivot shaft 267 to rotate in a clockwise direction (as shown in FIG. 2) disengaging the second fork-shaped engagement portion 263 of the second latch 265 from the second series of stations 261 of the second strike portion 259 of the second bracket 233. Advantageously, this back release 208 can be operated whether or not another party is sitting in the seat 201. Accordingly, this release 208 provides an extra measure of safety in accidents where parties sitting in the front seat may be incapacitated and it may be necessary for passengers sitting in the back seat to evacuate the vehicle on an emergency basis.

Again, when the seat 201 and, thus, the first slide bracket 229 and the second slide bracket 231 secured thereto, have been positioned in the desired location, the respective biasing members 251, 269 cause the respective pivot shafts 247, 267 to rotate bringing the engagement portions 243, 263 of the first and second latches 245, 265 into locking engagement with the first and second strike portions 239, 259, respectively. Likewise, as the first latch 245 rotates in a clockwise manner, the first latch 245 presses against the release appendage 329 of the release flange 295, forcing it downward until it is sandwiched between the first latch 245 and the first strike portion 239 of the first bracket 229.

Finally, the slide mechanisms 213, 215 can also be released in a third manner. Specifically, a user either already behind the seat back 205 or entering the back seat from the side door of a two-door vehicle releases the standard locking mechanism securing the seat back in a fixed upright position.

The user then pushes the seat back 205 forward (clockwise in FIGS. 4 and 5) to provide room for the user to enter or exit the back seat of the vehicle. As the seat back 205 rotates about the stud 309 beyond the directly upright position shown in FIG. 4, the stop 305 presses against a cam surface of the upper arm portion 313 causing the cam 311 to rotate clockwise (as shown in FIGS. 4 and 5). Thus, the upper arm portion 313 of the cam 311 moves toward the front of the assembly 211 and the lower arm portion 315 moves toward the back of the assembly 211 and, in particular, away from the end piece 320 of the sheath 319 held by the mounting bracket 307 secured to the lower hinge section 299. In turn, this pulls the end of the cable 293 secured to the pin 318 at the lower end of the lower arm portion 315 so that the cable 293 moves relative the sheath 319 which is secured against movement by the mounting bracket 307 at one end and by the pair of nuts 323 secured to the U-shaped portion of the finger extension 262 of the first mounting flange 258 secured to the first bracket 229 at the other end.

As will be appreciated, this causes the cable 293 to pull on the cylindrically shaped knob 325 held by the arms 327 of the release flange 295. When the force of the cable 293 is sufficient to overcome the force of the torsion spring 251 and helical spring 269, the release flange 295 begins to rotate upward (counterclockwise as shown in FIG. 3). Simultaneously, the release appendage 329 of the release flange 295 forces the first latch 245 to rotate in a counter clockwise direction so that the first engagement portion 243 of the first latch 245 begins to disengage from the first strike portion 239 of the first bracket 229. When the seat back 205 has rotated forward so that the seat back 205 and the sitting platform 203 form an angle of approximately forty-five degrees (as shown in FIG. 5), the first engagement portion 243 of the first latch 245 will be fully disengaged from the first strike portion 239 of the first bracket 229. In this position, the upper hinge 297 section and the horizontally extending portion of the lower hinge section 299 likewise form a forty-five degree angle.

Additionally, the rotation of the first pivot shaft 249 counterclockwise (as shown in FIG. 2) about its axis causes the distal end of the first flange 249 to travel away from the second pivot shaft 267 so that the link 284 pulls on the second flange 290, causing the second pivot shaft 267 to rotate in a clockwise direction (as shown in FIG. 2) disengaging the second fork-shaped engagement portion 263 from the second series of stations 261 of the second strike portion 259 of the second bracket 233. Advantageously, this arrangement requires neither the manipulation of separate seat back lock and slide mechanisms controls, nor the modification of the standard seatback release mechanism.

When the seat back 205 is again rotated into an upright position, the force of the torsion spring 251 and the helical spring 269 cause the respective pivot shafts 247, 267 to rotate bringing the engagement portions 243, 263 of the first and second latches 245, 265 into locking engagement with the first and second strike portions 239, 259, respectively. Likewise, as the first latch 245 rotates in a clockwise manner, the first latch 245 presses against the release appendage 329 of the release flange 295, forcing it downward until it is sandwiched between the first latch 245 and the first strike portion 239 of the first bracket 229. This in turn pulls on the end of the cable 293 held by the release flange 295, causing it to move relative the second end piece 321 of the sheath 319, which in turn causes the opposite end of the cable to be drawn into the sheath 319 until it reaches the position illustrated in FIG. 4.

Importantly, this auxiliary release 210 is configured to ensure that the slide mechanisms 213, 215 are not inadvertently released while the vehicle is in motion. Specifically, even if a party sitting in the seat 201 releases the seatback lock mechanism while the vehicle is moving, it would be virtually impossible for the auxiliary slide mechanism release 210 to be actuated. That is, it would be very unusual for the passenger to be able to adjust the seat back 205 forward of the directly upright position shown in FIG. 4, while sitting in the seat. Furthermore, even if the seat back 205 is positioned forward of the fully upright position, the slide mechanisms will not fully release until the seat back 205 forms the forward roughly forty-five degree angle shown in FIG. 5. This position is virtually impossible to attain while the passenger is seated, particularly if the passenger is wearing a seatbelt.

On the other hand, the passenger could freely adjust the seat back 205 between the fully upright position shown in FIG. 4 and the maximum back reclining position for almost any vehicle seat without releasing the slide mechanism 213, 215.

Figure 1:
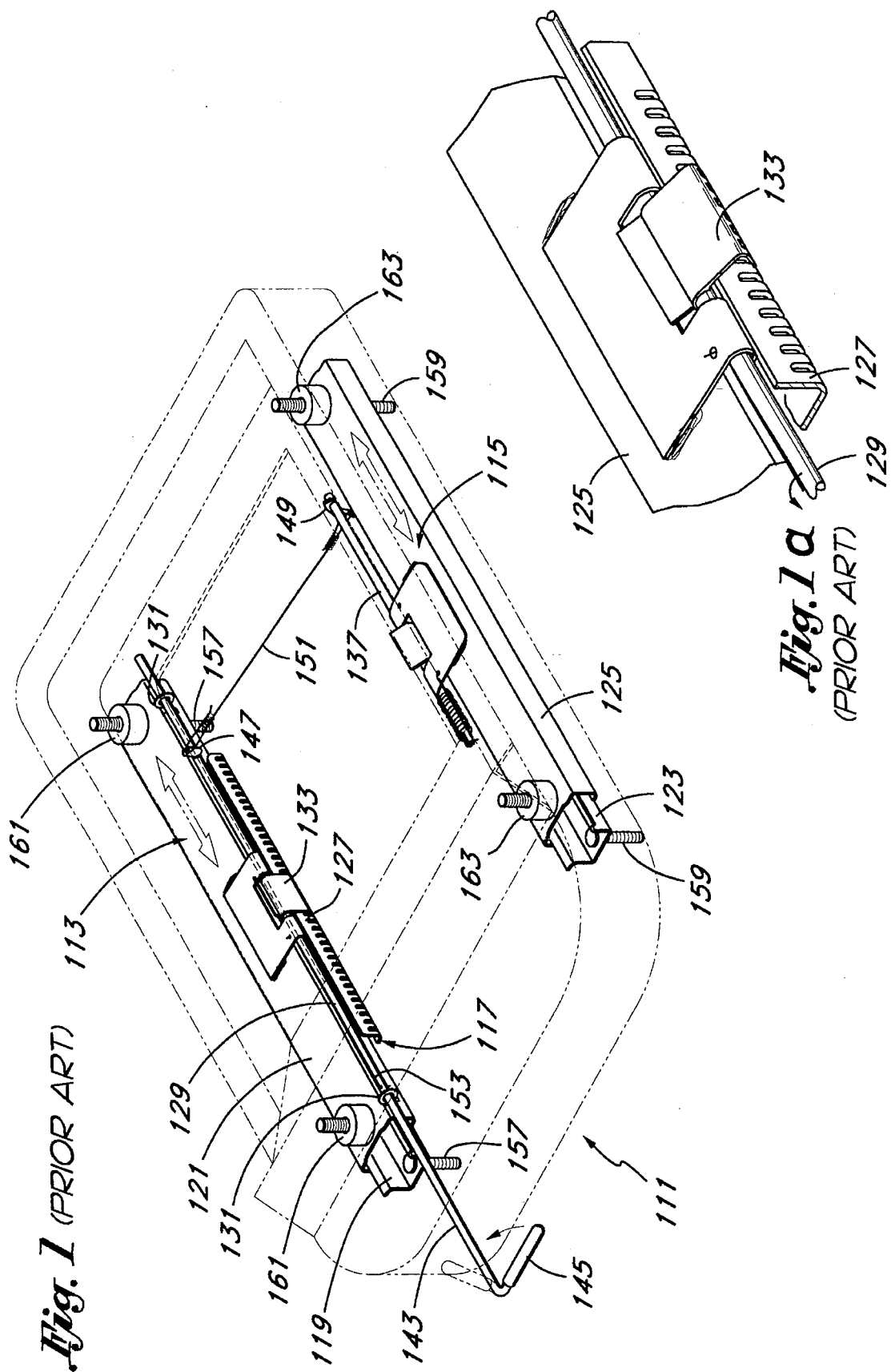
FIG. 1 is a perspective view of a prior art support assembly for a vehicle seat.

Significantly, the support assembly 211 of the preferred embodiment is configured to use many of the identical component parts as the support assembly 11 illustrated in FIG. 1. Accordingly, since tooling and initial manufacturing runs for these components have already been completed, much of the change-over costs typically involved in adopting a new support assembly design will be avoided. Importantly, the assembly requires no modification to the basic seat, seat back release mechanism or vehicle design. Desirably, the cost of the assembly is further reduced by utilizing the hinge actuator of the support assembly as a hinge mechanism between the sitting platform and the seat back on the one side instead of a separate hinge.

Numerous variations and modifications can be made without departing from the spirit of the present invention. Therefore, it should be clearly understood that the forms of the present invention described above and shown in the figures of the accompanying drawings are illustrative only and are not intended to limit the scope of the present invention.

I claim:

1. A support assembly for a seat having a sitting platform and a back rotatably secured thereto, comprising:

a first slide mechanism adapted to be mounted under one side of a seat, comprising:
      an elongate first support defining a first track having a first end and a second end;
      a first seat bracket slidable along said first track in a first direction of relative motion;
   a second slide mechanism adapted to be mounted under a seat opposite said first slide mechanism, comprising:
      an elongate second support defining a second track having a first end and a second end;
      a second seat bracket slidable along said second track in a direction of relative motion parallel to said first direction of relative motion;
   a first latch mounted on one of said first slide mechanism and said second slide mechanism selectively engageable to prevent movement of said one of said first or said second slide mechanism;
   a first actuator extending beyond said first end of said first bracket;
   a first linkage connecting said first actuator to said first latch such that a predetermined manual manipulation of said first actuator causes said first latch to disengage;
   a second actuator extending beyond said second end of said first bracket;
   a second linkage connecting said second actuator to said first latch such that a predetermined manual manipulation of said second actuator causes said first latch to disengage;
   a third actuator adapted to be secured to a seat back; and
   a third linkage connecting said third actuator to said first latch such that a predetermined movement of said third actuator causes said first latch to disengage.

2. The support assembly of claim 1, wherein said third actuator comprises an arm adapted to be secured to a seat back so that at least a first portion of said arm extends below a seat back axis of rotation and wherein said first end of said linkage is secured to said first portion of said arm.

3. The support assembly of claim 3, wherein said arm further comprises a second portion extending above a seat back axis of rotation and said assembly further comprises a stop adapted to be secured to a seat back so that forward rotation of said seat back causes forward rotation of said second portion of said arm.

4. The support assembly of claim 3, further comprising a second latch mounted on the other of said one of said first slide mechanism and said second slide mechanism, said second latch selectively engageable to prevent movement of the other of said one of said first or said second slide mechanism and wherein further said first actuator is linked to said second latch such that a predetermined manual manipulation of said first actuator causes said second latch to disengage, said second actuator is linked to said first latch such that a predetermined movement of said second actuator causes said second latch to disengage and said third actuator linked to said second latch such that a predetermined movement of said linkage causes said second latch to disengage.

5. The support assembly of claim 1, further comprising a second latch mounted on the other of said one of said first slide mechanism and said second slide mechanism, said second latch selectively engageable to prevent movement of the other of said one of said first or said second slide mechanism and wherein further said first actuator is linked to said second latch such that a predetermined manual manipulation of said first actuator causes said second latch to disengage, said second actuator is linked to said first latch such that a predetermined movement of said second actuator causes said second latch to disengage and said third actuator is linked to said second latch such that a predetermined movement of said linkage causes said second latch to disengage.

6. A seat having a front, a rear, a first side, and a second side, comprising:
   a sitting platform;
   a back rotatably mounted to said rear of said platform;
   a back lock selectively locking said back in a fixed upright position;
   a back lock release mounted on a first side of said back linked to said back lock so as to selectively release said back lock;
   a first slide mechanism mounted under said first side of said seat, comprising:
      an elongate first support defining a first track having a first end and a second end;
      a first seat bracket slidable along said first track in a first direction of relative motion;
   a second slide mechanism adapted to be mounted under said second side of said seat, comprising:
      an elongate second support defining a second track having a first end and a second end;
      a second seat bracket slidable along said second track in a direction of relative motion parallel to said first direction of relative motion;
   a first latch mounted on one of said first slide mechanism and said second slide mechanism selectively engageable to prevent movement of said one of said first or said second slide mechanism;
   a first actuator secured to and extending beyond said front of said sitting platform;
   a first linkage connecting said first actuator to said first latch such that a predetermined manual manipulation of said first actuator causes said first latch to disengage;
   a second actuator secured to and extending beyond said rear of said sitting platform;
   a second linkage connecting said second actuator to said first latch such that a predetermined manual manipulation of said second actuator causes said first latch to disengage;
   a third actuator connected to said seat back; and
   a third linkage connecting said third actuator to said first latch such that a predetermined movement of said third actuator causes said first latch to disengage.

7. The support assembly of claim 6, further comprising a second latch mounted on the other of said one of said first slide mechanism and said second slide mechanism, said second latch selectively engageable to prevent movement of the other of said one of said first or said second slide mechanism and wherein further said first actuator is linked to said second latch such that a predetermined manual manipulation of said first actuator causes said second latch to disengage, said second actuator is linked to said first latch such that a predetermined movement of said second actuator causes said second latch to disengage and said third actuator is connected to said second latch such that a predetermined movement of said linkage causes said second latch to disengage.

8. The support assembly of claim 6, further comprising a second latch mounted on the other of said one of said first slide mechanism and said second slide mechanism, said second latch selectively engageable to prevent movement of the other of said one of said first or said second slide mechanism and wherein further said first actuator is linked to said second latch such that a predetermined manual manipulation of said first actuator causes said second latch to disengage, said second actuator is linked to said first latch such that a predetermined movement of said second actuator causes said second latch to disengage and said third actuator is connected to said second latch such that a predetermined movement of said linkage causes said second latch to disengage.

9. A support assembly for a seat, comprising:
   a first slide mechanism adapted to be mounted under one side of a seat, comprising:
      an elongate first support defining a first track having a first end and a second end;
      a first seat bracket slidable along said first track in a first direction of relative motion, said first seat bracket defining a first end and a second end;
   a second slide mechanism adapted to be mounted under a seat opposite said first slide mechanism, comprising:
      an elongate second support defining a second track having a first end and a second end;
      a second seat bracket slidable along said second track in a direction of relative motion parallel said first direction of relative motion, said second seat bracket defining a first end and a second end;
   a lock connecting said first and second slide mechanism and selectively preventing movement of said first support relative said first bracket and said second support relative said second bracket, said lock comprising:
      a first series of stations fixed with respect to said first support;
      a first latch pivotably mounted to said first seat bracket, selectively pivotably engageable with each of said first series of stations about a first axis of rotation;
      a second series of stations fixed with respect to said second support;
      a second latch pivotably mounted to said second seat bracket, selectively pivotably engageable with each of said second series of stations about a second axis of rotation parallel to said first axis of rotation;
      a mount secured to said first slide mechanism;
      an actuator comprising a pivot shaft connected to said first latch and rotatably secured within said mount so as to be rotatable about said first axis of rotation, a first handle extending beyond said first end of said first bracket, whereby rotational movement of said actuator in a predetermined direction about said first axis of rotation causes said first latch and said second latch to disengage;

an auxiliary, release assembly, comprising:
  a hinge, comprising:
    a first hinge section adapted to be mounted to a seat back; and
    a second hinge section adapted to be mounted to a seat bottom, said second hinge section rotatably secured to said first hinge section;
  a linkage having a first end and a second end, said first end of said linkage secured to said first hinge section, and said second end of said wire connected to one of said first latch and said second latch, whereby rotational movement of said first hinge section relative said second hinge section causes said first latch and said second latch to disengage, wherein said hinge further comprises a pivot and said assembly further comprises a cam having a first arm portion and a second arm portion rotatably mounted on said pivot, said first end of said wire connected to said first arm portion, said other of said one of said first hinge section and said second hinge section further defining a stop exerting a rotational force on said second arm portion when said first hinge member rotates relative said second hinge member, wherein said actuator further comprises a second handle extending beyond said second end of said first bracket, wherein said first handle and said second handle are connected to opposite ends of a single shaft.

10. A support assembly for a seat, comprising:
  a first slide mechanism adapted to be mounted under one side of a seat, comprising:
    an elongate first support defining a first track having a first end and a second end;
    a first seat bracket slidable along said first track in a first direction of relative motion, said first seat bracket defining a first end and a second end;
  a second slide mechanism adapted to be mounted under a seat opposite said first slide mechanism, comprising:
    an elongate second support defining a second track having a first end and a second end;
    a second seat bracket slidable along said second track in a direction of relative motion parallel said first direction of relative motion, said second seat bracket defining a first end and a second end;
  a lock connecting said first and second slide mechanism and selectively preventing movement of said first support relative said first bracket and said second support relative said second bracket, said lock comprising:
    a first series of stations fixed with respect to said first support;
    a first latch pivotably mounted to said first seat bracket, selectively pivotably engageable with each of said first series of stations about a first axis of rotation;
    a second series of stations fixed with respect to said second support;
    a second latch pivotably mounted to said second seat bracket, selectively pivotably engageable with each of said second series of stations about a second axis of rotation parallel to said first axis of rotation;
    a mount secured to said first slide mechanism;
    an actuator comprising a pivot shaft connected to said first latch and rotatably secured within said mount so as to be rotatable about said first axis of rotation, a first handle extending beyond said first end of said first bracket and a second handle extending beyond said second end of said first bracket;
  an auxiliary release assembly, comprising:
    a hinge, comprising:
      a first hinge section adapted to be mounted to a seat back; and
      a second hinge section adapted to be mounted to a seat bottom, said second hinge section rotatably secured to said first hinge section;
    a sheath having a first end and a second end, said first end of said sheath secured to one of said first hinge section and said second hinge section, and said second end of said sheath secured to one of said first slide mechanism and said second slide mechanism;
    a wire slidably mounted within said sheath having a first end and a second end, said first end of said wire connected to the other of said one of said first hinge section and said second hinge section, and said second end of said wire connected to one of said first latch and said second latch.

11. The support assembly of claim 10, wherein said hinge further comprises a pivot and said assembly further comprises a cam having a first arm portion and a second arm portion rotatably mounted on said pivot, said first end of said wire connected to said first arm portion, said other of said one of said first hinge section and said second hinge section further defining a stop exerting a rotational force on said second arm portion when said first hinge member rotates relative said second hinge member.

* * * * *